MEMORY DEVICE EMPLOYING A PROPAGATION MEDIUM

Filed Nov. 22, 1967 3 Sheets-Sheet 1

INVENTOR
J. L. SMITH
BY
Herbert M. Shapiro
ATTORNEY

April 21, 1970 J. L. SMITH 3,508,225

MEMORY DEVICE EMPLOYING A PROPAGATION MEDIUM

Filed Nov. 22, 1967 3 Sheets-Sheet 3

United States Patent Office 3,508,225
Patented Apr. 21, 1970

3,508,225
MEMORY DEVICE EMPLOYING A PROPAGATION MEDIUM

James L. Smith, Bedminster, N.J., assignor to Bell Telephone Laboratories, Incorporated, Murray Hill, N.J., a corporation of New York Filed Nov. 22, 1967, Ser. No. 685,143
Int. Cl. G11c *11/14, 19/00*
U.S. Cl. 340—174 10 Claims

ABSTRACT OF THE DISCLOSURE

A memory arrangement comprising a plurality of propagation channels is described. The channels fan-in to a common "recirculating" channel at both input and output ends. Each propagation channel serves as an information storage location. Write and read operations are carried out by means of write and read windings coupled to the common channel. Information is moved to the common channel for a read or write operation by advancing information in the common channel and in the selected storage channel. The arrangement requires very few lead connections and is characterized by a high signal-to-noise ratio.

FIELD OF THE INVENTION

This invention relates to information storage units and more particularly to memories which employ propagation media in which, for example, magnetic domains may be propagated.

BACKGROUND OF THE INVENTION

Magnetic domains and the propagation thereof in a magnetic medium are well known in the art. Patent 2,919,432, issued Dec. 29, 1959, to K. D. Broadbent, for example, describes the movement of such domains in a shift register arrangement. Copending application, Ser. No. 579,931, filed Sept. 16, 1966, for A. H. Bobeck, U. F. Gianola, R. C. Sherwood, and W. Shockley (now Patent 3,460,116) describes the movement of single wall domains in a two-dimensional shift register.

Single wall domains are reverse-magnetized domains in a magnetic medium magnetically saturated in the opposite direction. The domains are characterized by a domain wall which closes on itself to provide a domain having a boundary independent of the boundary of the medium in which it is moved. Domains of this type are shown in the Journal of Applied Physics, volume 30, pages 217–225, February 1959, and are observed experimentally with polarized light by means of the Faraday effect.

The above-mentioned copending application employs as a domain propagation material a rare earth orthoferrite which is substantially isotropic in the plane of the sheet of material and has a preferred direction of magnetization substantially normal to the plane of the sheet. It is convenient to use the same material herein illustratively. It is to be understood, however, that any material in which single wall domains may be moved is useful in accordance with this invention.

When materials such as the orthoferrites are employed as the sheet in which single wall domains are moved, the sheet may be assumed saturated in a first direction along an axis normal to the plane of the sheet and the single wall domains may be assumed saturated in the opposite direction along that axis. Thus, we may assume that the sheet is saturated say downward or in a negative direction and the single wall domain includes flux directed upward or in a positive direction. A single wall domain then may be represented by an encircled plus sign where the circle represents the single domain wall thereabout. We will have occasion to employ this representation hereinafter.

Single wall domains are moved by generating an attracting field in positions consecutively offset from the position occupied by the domain. This is accomplished conveniently by printed circuitry deposited on the surface of the magnetic sheet and pulsed in a three-phase cycle. In this manner, single wall domains may be moved from input to output positions to provide a shift register operation as is discussed in detail in the aforementioned copending application.

In accordance with this invention, a plurality of single wall domain shift registers are utilized to provide a memory having relatively few electrical connections thereto and a relatively high signal-to-noise ratio.

Magnetic memories are known to be organized in a variety of ways. One common organization is called "random access." This organization permits any bit location in an array of bit locations to be accessed individually. Another familiar organization is termed "word organized." This organization permits all the bits in a word to be accessed in common.

The number of external connections differs for each type of memory. If we assume an array of $n \times n$ bits, the random access memory requires $2n$ (i.e., $n+n$) drive conductors and thus $2n$ connections. A word-organized memory as for example a two-dimensional linear select memory of $n$ words $m$ bits each requires $n+m$ connections.

SUMMARY OF THE INVENTION

This invention is based on the realization that information may be stored as a pattern of single wall domains in each of a plurality of shift register or propagation channel portions which share a common shift register channel. Read and write operations, however, are performed in the common channel. The arrangement functions partially as a word-organized memory wherein each word occupies a separate shift register channel portion. A word location is selected for a write or read operation by providing propagation pulses along the common channel and along the selected channel portion. The so selected information advances to the common channel to which external connections are made to perform the requisite functions. The number of external connections is a fraction of the number of words stored therein. Thus, for example, an 800-word memory of 4 bits each may require only about 60 external connections as will be discussed in detail hereinafter.

DETAILED DESCRIPTION

The aforementioned copending application provides a convenient point of departure in the description of the present invention. There are a few fundamentals about the operation of single wall domain propagation devices which are to be understood in order to expedite the following description. First, inasmuch as single wall domains have boundaries independent of the boundary of the sheet in which they are moved, they provide a two-dimensional flexibility. That is to say, a single wall domain may be moved along X or Y axes with respect to an origin coincident with the position occupied by the domain. For this movement, all that is necessary is the generation of an attracting field, offset from the occupied position, in the desired direction. Secondly, directionality in a propagation channel is provided by a three-phase propagation sequence. If only two phases are provided, information only shuttles back and forth between next adjacent positions.

Figure 1:
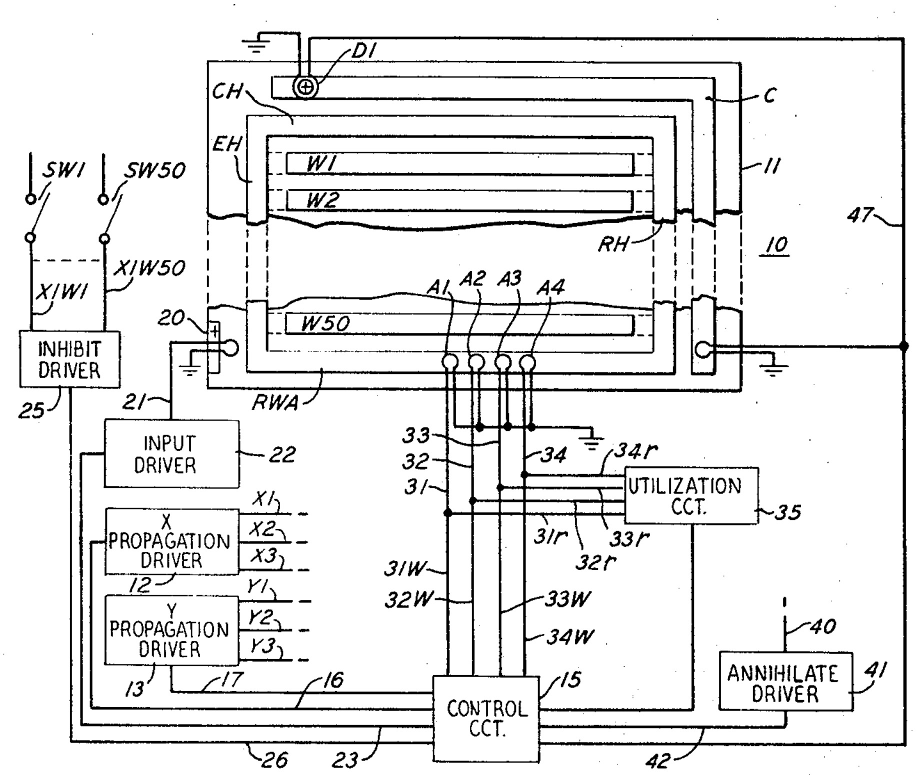
FIG. 1 is a schematic illustration of a memory arrangement in accordance with this invention.

In accordance with the present invention, information is stored as patterns of single wall domains in selected information propagation channels. FIG. 1 shows an arrangement 10 in accordance with this invention. The arrangement includes a sheet 11 of magnetic material in which single wall domains may be moved. The domains are moved along separate channel portions oriented along (horizontal) X directions in sheet 11. Rectangular blocks W1 . . . W50 represent channel portions in which the presence and absence of domains are stored in patterns each of which represents a set of binary words as will be discussed more fully hereinafter. Each channel portion is to be understood to correspond to a single wall domain shift register of the type described in the aforementioned copending application. Illustratively, fifty word sets of sixteen words each are stored in fifty word-set locations.

The fifty word-set locations are encompassed by a recirculating shift register channel comprising four distinct portions. One portion is oriented along a (vertical) Y direction and may be termed descriptively an "entrance highway" for information introduced into an operative area of the memory in which the read and write operations are performed. This section is designated EH in FIG. 1. The next portion of the recirculating channel is similarly termed the "connecting highway" and is designated CH in FIG. 1. A "return highway," RH, also shown in FIG. 1, connects the connecting highway to the last portion of the recirculating channel which portion is conveniently called the "read-write area," RWA. The channel portions are arranged in parallel with the connecting highway and are selectively substituted for the latter during a write or read operation.

The overall operation of the memory is similar to the operation of an automatic garage. A car is driven into an automatic garage through one of a number of common driveways. A ticket (address) is provided upon entrance and a parking space (word-set location) is assigned for the car. The car is driven into a cage which transfers the car to the assigned parking space. When the car is picked up, the reverse operation is carried out and the car is returned to a common driveway for exit.

The comparison is completed by a recitation of the memory operation. In the present memory, information (a binary word-set) is introduced and read out in the read-write area which is comparable to the driveways of the automatic garage. A word-set location is selected (i.e., W1 through W50) and the stored word-set (i.e., the car) is transferred to that location by substituting the corresponding channel portion for the connecting highway CH in the recirculating channel. The channel portions W1 through W50 of the memory thus constitute the parking spaces of a parking garage for which the read-write area constitutes an entrance and exit.

FIG. 1 also shows drive and control circuitry for carrying out the various implementations for achieving this operation. These implementations will be described first before an illustrative operation is discussed.

Specifically, a plurality of conductors X1, X2, and X3 couple associated (X1, X2, X3, X1, X2 . . . ) positions for domains in sheet 11. Similarly, a plurality of conductors Y1, Y2, and Y3 also couple associated positions for domains. The X conductors are connected between an X propagation driver 12 and ground and the Y conductors are connected between a Y propagation driver 13 and ground. The X and Y drivers pulse the X and Y conductors in a three-phase manner under the control of a control circuit 15 to which those drivers are connected by conductors 16 and 17, respectively. Propagation of a domain (or the absence of a domain) along a shift register channel portion, the connecting highway, or the read-write area is in response to the pulsing of X conductors to generate consecutively offset attracting fields along the selected channels. Propagation along the entrance highway EH and the return highway RH is in response to the synchronized pulsing of the Y drive conductors.

Sheet 11 includes a source of positive magnetization 20 from which single wall domains may be generated for introduction into the memory. To this end a conductor 21 couples sheet 11 adjacent source 20. Conductor 21 is connected between an input driver 22 and ground. Conductor 21, when pulsed by driver 22, generates an attracting field next adjacent source 20 producing (i.e., pulling out of source 20) a domain in the coupled portion for inclusion into the entrance highway when a next consecutive (phase-three) propagation pulse is supplied. In this manner, single wall domains are appropriately introduced into the entrance highway for storage in selected word locations. The input driver 22 is under the control of control circuit 15 to which it is connected by a conductor 23.

Information is stored in the memory of FIG. 1 as the presence and absence of domains as has been mentioned hereinbefore. Source 20 and conductor 21 operate to fill each bit (phase-three) position in the recirculating path of the memory with domains. A plurality of couplings operate to annihilate domains in selected bit positions in that recirculating path when pulsed in order to provide the requisite absence of domains.

The couplings for annihilating domains are shown coupled to the read-write area in FIG. 1 and are designated A1, A2, A3, and A4 there. The coupling positions correspond to third-phase (X3) positions which are the closest stable positions which adjacent single wall domains may occupy in a three-phase system as is well understood. The phase-three positions so coupled are not next adjacent phase-three positions, however. Rather, those coupled positions are spaced apart a number of bit positions corresponding to the number of words capable of being stored in each channel portion plus one additional bit position. The reason for this choice of spacing will become clear hereinafter.

The couplings are pulsed synchronously and in a coded manner to provide a corresponding domain pattern which represents a single stored word. Information then is stepped three phases to the right and the next code is provided.

We see, then, that operation starts at source 20 with domains generated into each bit position. Subsequently, information is written in at the positions of couplings A1, A2, A3, and A4 before being stored in a selected channel portion. Information stored in channel portions also is propagated to the read-write area for a read operation. The propagation of single wall domains through selected paths in the memory accordingly is required. Let us look at the selective propagation operation in more detail in order to be fully understand the controlled movement of domains along those paths.

Figure 2:
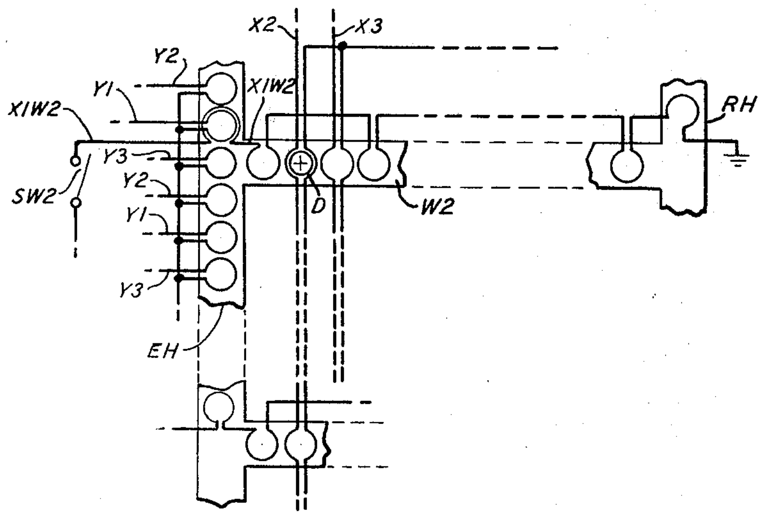
FIGS. 2, 3, 5, 6, and 7 are schematic illustrations of portions of the memory of FIG. 1.

Operation in accordance with an illustrative embodiment of this invention specifically requires that domains stored in a selected word-set location be propagated into the entrance highway EH. FIG. 2 shows several propagation conductors in the vicinity of the intersections between a representative word-set location or channel portion W2 and the entrance highway. One may visualize a single wall domain D propagating to the left along a selected channel portion W2 as viewed in the figure and occupying an X2 position currently. A select conductor X1W2, the designation of which is justified hereinafter, is next pulsed and domain D advances another position to the left as viewed. Domain D now occupies an X1 position at the left end of word-set location W2. Conductor Y3 is then pulsed and domain D moves laterally one position into the entrance highway EH. Next consecutive pulses on conductors Y2, Y1 . . . move domain D downward in highway EH. A similar propagation arrangement exists at each intersection between a word-set location and a highway.

For simple shift register operation as required herein, however, like designated propagation conductors are pulsed simultaneously generating therealong a pattern of fields for each pulse applied thereto. Thus information is advanced synchronously all along the entrance highway as the foremost domains (or absent domains) are moving into that highway from channel portion W2. If, for example, conductor Y1 is pulsed as conductor X1W2 is pulsed, a domain may thereafter advance along the entrance highway into a Y3 position rather than moving from location W2 into that position. Accordingly, it is necessary to inhibit certain pulses, such as that pulse on conductor Y1, to prevent such spurious operation.

Select conductors X1W1 through X1W50 of FIG. 1 operate to this end. Each of those conductors couples the X1 positions along a correspondingly numbered word-set location in a manner to provide a pattern of attracting fields for domains moving along the so-coupled channel portion. To this extent, each such conductor operates as a phase-one conductor. The conductors, however, further couple the Y1 position next adjacent the corresponding channel portion in each of the entrance and return highways. In this connection, it has been found convenient to refer to both the propagation conductor and the coupled positions in sheet 11 by the phase designation. Thus, a second phase propagation conductor is an X2 or a Y2 conductor and the corresponding positions coupled by those conductors are also designated X2 and Y2, respectively. Since the phase-one conductor is unique for each channel portion, the designation for the channel portion is added to the designation for that conductor. Thus, the phase-one conductor for channel portion W2 is designated X1W2.

The second and third (X2 and X3) phase conductors for all the channel portions are in common as shown in FIG. 2. Information stored in nonselected word-set locations shuttles between X2 and X3 positions when phase-two and phase-three conductors are pulsed in the absence of phase-one pulses. Only in the selected word-set location (channel portion) is a phase-one pulse applied, and, consequently, only in that word-set location is information admitted to the entrance highway (and from the return highway). Importantly, phase-one pulses along a selected word-set location inhibit a phase-one (Y1) field adjacent the selected location along the entrance and return highways. An inhibit function at those Y1 positions conveniently takes the form of a field of a polarity to collapse domains thus canceling the effect of the concurrent Y1 pulse. Any domains in the adjacent positions in the return and entrance highways go out of phase with the propagation sequence and are annihilated by later propagation pulses.

The collapse (inhibit) field is obtained by coupling the Y1 (inhibited) positions by the word-set location phase-out conductor (i.e., conductor X1W2 as shown in FIG. 2) in a sense opposite to that in which the phase-one positions (X1) are coupled. The phase-one select conductors X1W2 are connected between an inhibit driver 25 and ground as shown in FIG. 2. Driver 25 is connected to control circuit 15 via a conductor 26 and may comprise a phase-one connection to propagation driver 12.

Each of the select conductors may include a switch, SW1 . . . SW50, the closure of which is necessary for selection of a channel portion as a substitute for the connect highway in the recirculating channel. Switches SW1 . . . SW50 are conveniently closed by mechanical means such as number-select buttons on a repertory dialer but may be closed electronically. We will assume a mechanical control (not shown) for the switches and the illustrative operation hereinafter will be in terms of a repertory dialer in which as many as sixteen four-bit words representative of a sixteen (decimal) digit number may be stored in each channel portion (word-set location) and in which four bits of a word are read out in parallel.

The annihilate (write) implementation comprises, illustratively, couplings to the read-write area RWA as already described. The couplings are shown in FIG. 1 and, it is remembered, correspond to a phase-three position in the write-read area. The read implementation shares those same couplings. The couplings are defined by conductors designated 31, 32, 33 and 34 each connected to both write (W) and read ($r$) conductors which are correspondingly designated. The write conductors 31W, 32W, 33W and 34W are connected to control circuit 15. The read conductors 31$r$, 32$r$, 33$r$ and 34$r$ are connected to a utilization circuit 35 which in turn is connected to control circuit 15.

The propagate, replicate, annihilate, and read implementations as well as the selection of a storage location have now been described. Let us now examine how these mechanisms cooperate in a repertory dialer. Let us assume that a single wall domain is stored in every bit (phase-three) position in the memory and that a decimal digit representation comprises four binary bits each comprising both the presence (a one) and the absence (a zero) of a single wall domain in a coded pattern. The initial condition is achieved easily by operating the propagation drivers and the input driver synchronously to replicate domains from source 20 into each possible (phase-three) position and by consecutively closing switches SW1 through SW50. The initial condition is merely a convenient starting point. The description hereinafter will point out that such a condition is re-established during each read or write operation.

At this juncture in the description it is helpful to be more specific about the organization of information herein as a context in which the read and write operations are more readily understood.

Figure 3:
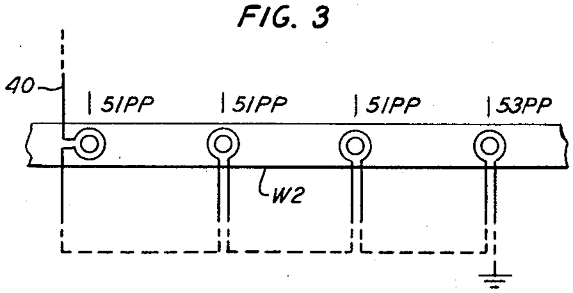

Each channel portion has an information allocation as shown for a representative portion W2 in FIG. 3. The portion is divided into four 17 bit-position sections, one position for each bit of the sixteen decimal digit representations capable of being stored there plus an additional code bit position. The first (code) bit position of each section includes a binary zero (absent domain) employed for keeping track of the information. The bit positions are referred to as increasing numerically from right to left in each section. The first bit position, then, of the first decimal digit representation follows the code bit in the first section which is the rightmost section as viewed in FIG. 3. The first bit of the second decimal digit occupies the next position to the left, etc. The pattern repeats in the second section for the second bits of consecutive decimal digits. There, the first and second positions after the code bit are occupied by the second bits of the first and second digit respectively.

Let us assume that we desire to write a telephone number in the W2 channel portion. The telephone receiver is elevated closing a switch hook (not shown). A write switch, also not shown, is depressed followed by the depression of a W2 number-select button (not shown) to close switch SW2. The write and the number-select buttons are common in existing repertory dialers and may be adapted directly in accordance with this invention. The structure and function of these elements are well understood and a discussion thereof is, accordingly, omitted herein as adding only negligibly to an understanding of this invention. The elements are assumed present, in control circuit 15, as called for.

The closure of the switch hook initiates a replication of domains into consecutive bit positions spaced apart three phase positions in the recirculating path comprising the various highways and the read-write area. The replication of domains takes place in response to pulses on conductor 21 synchronized with phase-two pulses for pulling domains from source 20. Domains so moved from source 20 are positioned to move to an adjacent phase-three position in the recirculating path during a next consecutive third phase. The filling of the recirculating path takes place quickly. As will be seen hereinafter there are fewer than 1000 phase positions in the recirculating path and propagation is at a megacycle rate. Thus, the path is filled in a small fraction of a second.

The closure of the write switch enables any channel portion later selected by a "number-select" switch also to be so filled with domains.

The depression of the W2 number-select button causes switch SW2 to close and phase-one pulses to be applied to channel portion W2. Those pulses, it is remembered, serve to inhibit passage of domains in the entrance highway and the return highway beyond the interconnections between those highways and channel portion W2. Domains are, consequently, circulated around the path comprising the W2 channel portion, the entrance highway, the read-write area, and the return highway as new domains are being introduced into next consecutive bit positions by replication from source 20. When all bit positions in the path including channel portion W2 are filled with domains, the absence of domains which may have occupied bit positions in portion W2 previously are annihilated.

The bit positions in a channel portion will be referred to as "home" positions hereinafter.

When all positions in the selected channel portion are filled with domains, propagation stops and domains are annihilated from coded positions in the selected channel portion (actually in each channel portion). This annihilation of domains in home positions is accomplished by a winding which couples coded ones of the home positions of all the words in memory. The annihilate arrangement is shown in FIG. 3 as a conductor 40 coupled to all the "coded" home positions. The sense of the coupling to the coded home positions is such as to cause domains in those positions to collapse when conductor 40 is pulsed. Conductor 40 is connected between an annihilate driver 41 and ground. Driver 41 is connected to control circuit 15 by a conductor 42. A timer included within control circuit 15 provides an appropriate pulse on conductor 40, concurrently with a phase-three propagation pulse, after a sufficient time to permit the filling of all bit positions with domains.

After the coded home positions of the selected channel portion are cleared of domains, the domains stored in that channel portion are advanced to the left as viewed, down the entrance highway, and into the read-write area until the foremost coded home position zero is one bit position to the right of a sense coupling (i.e., A4 of FIG. 1). The information is organized so that, under such a condition, each home position zero is to the right of corresponding couplings A1–A4, which are spaced apart like distances to permit this correspondence.

A counter is employed to keep track of the propagation operation. The counter is shown as an additional domain propagation channel, designated C in sheet 11, to which the propagation conductors are coupled for producing domain motion. A single wall domain D1 is stored permanently in a home position as shown in counter C in FIG. 1. The domain D1 is advanced to the right as the propagation operation proceeds in the selected channel portion. The propagation of the domain D1 is synchronized with the propagation of the all-zero code in the selected channel portion.

The memory of FIG. 1 is so arranged that when the first coded home position zero is one bit to the right of the coupling A4 of FIG. 1, it is one-half the distance (number of bit positions) in the recirculating path from its initial home position. Hereafter, the domain D1 is propagated backwards in synchronism with the forward propagation of the information bearing domain pattern. When domain D1 reaches its home position, the information bearing domains will be in their proper home positions. The movement of the coded home position zeros past couplings A1 through A4 causes an all-zero code to be induced therein. In response to that all-zero code, control circuit 15 operates to reverse switches (not shown) altering the propagation sequence to the counter C. In this manner, domain D1 is enabled to return to its home position as later applied propagation sequences in the selected path of the memory advance information there. Propagation ceases when domain D1 arrives at its home position. That arrival of domain D1 is detected by a conductor 47 which is connected to control circuit 15 to this end.

As domain D1 returns to its home position in counter C, additional input information is introduced into memory during a write operation. Remember that all bit positions in the memory are initially occupied by domains. To store a zero, then, a domain in an appropriate position is annihilated. Couplings A1 through A4 are pulsed when a zero is to be stored in the corresponding position. Consider, in the context of a repertory dialer, the situation when a decimal digit is "dialed" by the subscriber for storage in a selected position, W2, in the storage area. The typical two-out-of-seven code from the telephone is translated to a binary code, by well known means, not shown. The couplings A1 to A4 are pulsed where zeros are required in that binary code for properly representing the decimal digit dialed. Each pulse pattern on conductors A1–A4 is followed by a single three-phase propagation sequence to move information one position to the right as viewed. When the subscriber dials the next digit, the process repeats all under the control of control circuit 15 which may be taken to include any suitable two-out-of-seven to binary code translator. The consecutive digits of a called number are stored in this manner, the four bits representative of a single digit occupying spaced apart positions having like relative positions with respect to the corresponding couplings A1 through A4.

After all digits are stored, a switch hook or end-of-write switch is opened typically when the telephone receiver is replaced in its cradle. When such a switch is opened, all stored information is returned through the return highway to the corresponding storage positions in the selected word location as the domain D1 in counter C returns to its home position.

The various switches and logic arrangements for accomplishing the various repertory dialer functions are assumed included in control circuit 15. The details of such logic and switch implementations are not necessary for an understanding of this invention and so are omitted. Copending applications Ser. No. 550,389, filed May 16, 1966, for A. H. Bobeck and J. L. Smith, and Ser. No. 554,378, filed June 1, 1966, for U. F. Gianola, R. A. Kaenel and J. L. Smith, however, describe switch and logic implementations adaptable for the described purpose.

A read operation is similar to a write operation. When a telephone receiver is elevated from its cradle, the switch hook again is closed. In response, domains are propagated around the recirculating path comprising the entrance highway, the read-write area, the return highway, and the connecting highway. Domains are replicated into this path at consecutive bit positions from source 20 as described hereinbefore under the control of control circuit 15. When the subscriber depresses a number-select button without depressing a "write" button first, however, the corresponding switch SW1 closes and the digit representation in the selected channel portion is moved to the read-write area. No replication takes place after the number-select button is depressed during a read operation.

Counter C again keeps track of the information, domain D1 therein moving in coincidence with the moving information. When the home position zeros pass the corresponding couplings A1 through A4, outpulsing of those couplings occurs, in parallel, representing consecutive decimal digits for detection via utilization circuit 35. In a repertory dialer, the propagation rate is reduced at that time to enable outpulsing at a normal ten-digit rate acceptable to telephone central offices. The utilization circuit in this context is typically translator circuitry in a telephone central office. The reader is reminded of the fact that a domain occupies each position in memory except where annihilated to represent a binary zero. If each decimal digit representation includes at least one binary zero, consecutive coded representations are outpulsed, then, until an all-one code is outpulsed. Such a code indicates that the stored number has been read in its entirety. Control circuit 15 responds by propagating information back to corresponding storage positions. The all-zero code again operates to reverse the direction of propagation in the counter as already described.

Although the memory of FIG. 1 has general applicability to any storage operation, its use as a repertory dialer is clear. Mention of this particular use is intended only to provide a familiar context in which the basic memory operations may be understood. For like reasons, the particular organization of the information control is chosen as will be clearly demonstrated in the illustrative operation hereinafter. It is to be understood, however, that the memory is suitable for other uses and, for example, only one of conductors 31 through 34 need be used to impart to the memory the capability of changing only a single bit as is frequently required of random access memories.

We have now described the various implementations and the corresponding operations and are in a position to describe an illustrative operation. In keeping with the foregoing description, the operation will be described in terms of a repertory dialer. The description will be rendered in connection with a pulse diagram of only the memory operation shown in FIGURE 4.

Table I shows the correspondence between decimal digits and their binary representation.

TABLE I

| | |
|---|---|
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |

The codes 0000 and 1111 are forbidden since the former is representative of the coded home positions and the latter is representative of the end-of-number indication. Each zero is represented by an absent domain, each one by a domain. A decimal digit five then is represented by 0101 which is stored in the form shown in FIG. 5, the positions two positions to the right of those shown coupled by conductors 31 through 34 being taken to include the all-zero "home position" code. The digit eight is represented by the binary code 1000 as shown in FIG. 6. FIG. 7 shows the domain pattern for an illustrative telephone number 582–3648. The upward direction arrows indicate the positions coupled by conductors 31 to 34. The broken circles represent binary zeros or absent domains.

Figure 5:
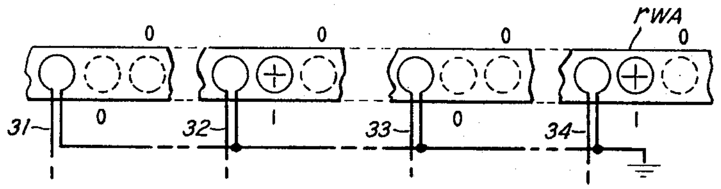
Figure 6:
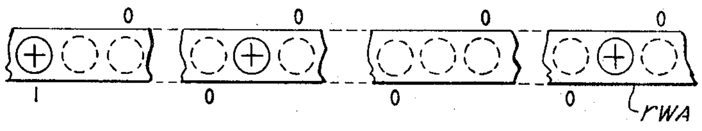
Figure 7:
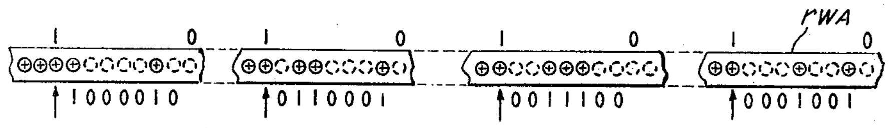

The representations shown in FIGS. 5, 6 and 7 are provided by pulse patterns on conductors 31 through 34. Specifically, a pulse is applied to each of those conductors coupled to positions where a domain is to be annihilated. A three-phase propagation sequence follows each coded pulse set. Thus, as indicated in FIG. 5, information is stepped one position (three phases) to the right and conductors 31 and 33 are pulsed. As indicated in FIG. 6, information is stepped again one position to the right and conductors 32, 33 and 34 are pulsed. Pulse codes are so applied consecutively each time information is stepped to the right until a complete number is stored as shown in FIG. 7. The unused positions of course still have domains as shown by the encircled plus signs following the designated codes in FIG. 7.

A write operation is initiated by the closure of the switch hook followed by the depression of a write button in the telephone subset and by the closure of say switch SW2 which provides phase-one pulses to channel portion W2 only. Concurrently, phase-one pulses are applied to the highways EH, CH, and RH and to the read-write area RWA along with phase-two and phase-three pulses shown initiated at time *t*0 in FIG. 4. Any information stored in the selected channel portion is moved to the left, down the entrance highway into the read and write area in channel portion W2.

Figure 4:
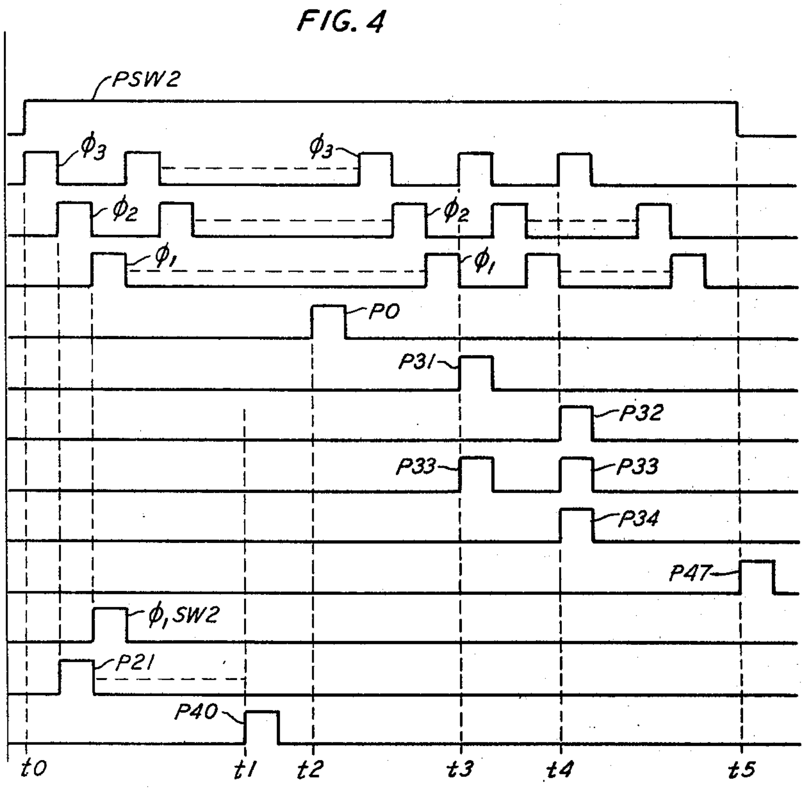
FIG. 4 is a pulse diagram of the operation of the memory of FIG. 1.

Let us assume that switch SW2 is closed at a time *t*0 in FIG. 4 in response to the depression of the corresponding number-select button. Any information stored in channel portion W2 moves to the left and down the entrance highway. Concurrent with phase-two applied for moving that information, pulses P21 are applied for replicating domains from source 20. Consider the situation when the information represented in FIG. 7 is so moving down the entrance highway. Each phase-three propagation pulse finds an additional (replicated) domain moving into the phase-three position next adjacent the source 20. Any phase-three positions already occupied by domains cannot be filled with an additional domain. The additional domain simply moves to the next consecutive unoccupied phase position which is a phase-one position and is annihilated by the next consecutive propagation sequence. Any stored information, of course, is destroyed in this manner.

At a time *t*1 in FIG. 4, pulse P40 is applied to conductor 40 to introduce the home position zero code. Propagation pulses continue and the home position zero code moves to the read-write area. Counter C keeps track of the zeros as has been described and three-phase pulses are applied to counter C for advancing domain D1 synchronously for this purpose.

At time *t*2, the all-zero code arrives at the positions coupled by conductors 31–34 providing a pulse P0 for terminating the forward movement for information in the memory and for altering following propagation sequences applied to the counter so that those sequences propagate domain D1 toward its home position as information is stored in memory. The home position zeros are now one position to the left of the position shown for them in FIG. 5.

Consecutively input codes are now applied to conductors 31 through 34 as information is advanced. The pulse sequence for the storage of the digits eight and five is shown at times *t*3 and *t*4 in FIG. 4. As shown there pulses P31 and P33 on conductors 31 and 33 accompany a phase-three pulse to annihilate the appropriately positioned domains. The phase pulses in FIG. 4 are designated $\phi_1$, $\phi_2$, and $\phi_3$ to refer to either X or Y pulses where appropriate. Pulses P32, P33, and P34 accompany the next following phase-three pulse. Meanwhile, domain D1 is being returned synchronously to its home position. Consecutive digits may be written in by the depression of digit buttons on a telephone handset. Propagation pulses are applied typically at a megacycle rate. Consequently, control circuit 15 operates on the propagation drivers to permit only one three-phase cycle each time a digit is stored.

The depression of an end-of-write button or the return of the receiver to the cradle activates drivers 12 and 13 to propagate the stored information back to appropriate home positions reached when domain D1 returns to its home position as signaled by a pulse P47 in conductor 47 at time $t5$. Pulse P47 may also be utilized to open switch SW2. Usually repertory dialers include lock-out mechanisms for permitting only one number select button to be depressed at a time. If such an implementation is present, pulse P47 need not be so adapted. The illustrative write operation is now complete.

For a read operation, information in channel portion W2 is again moved to the read-write area. This operation, in a repertory dialer context, is responsive to the depression of a number-select button (SW2) in the absence of the depression of the write button. Counter C tracks the information movement as was the case in the write operation. When information arrives at conductors 31 through 34 during a read portion, pulse P40 is present as shown in FIG. 4 at time $t1$. The propagation pulse rate in response is reduced (by well known means not shown) and the domain patterns generate consecutive coded signals in conductors 31 through 34 for detection by utilization circuit 35 under the control of control circuit 15. The consecutive digit representation shown in FIG. 7 generate signals corresponding to the stored number at a rate acceptable by the central office. When an all-one code is generated, see FIG. 7, the propagation rate increases and the stored information is returned to corresponding home positions as tracked by counter C. An illustrative read operation is now complete.

The utility of a memory in accordance with this invention is appreciated more fully by a comparison between the number of connections required by this memory with the number required by a comparable word-organized memory. We have stated that a word-organized memory requires $n+m$ connections where $n$ is the number of words and $m$ is the number of bits in a word. For the present arrangement, $n=50\times16=800$ words and $m=4$ bits per word. Consequently, 804 connections are required. In accordance with the present invention, we require, basically, fifty connections, one for each channel, plus four for the readout. A fixed number of additional connections are needed; but these are few and do not increase in number as the number of words increases.

For most existing magnetic memories, a sense pickup couples a bit position at which signals are generated and various bit positions at which flux is shuttled. Noise is generated in the latter and the signal-to-noise ratio characteristic of the memory so coupled is relatively low. In accordance with this invention, the conductors 31 through 34, as shown in FIG. 1, couple only one bit position each and that position is the one at which the signal is generated. Consequently, virtually no noise is picked up during a read operation and the signal-to-noise ratio is high.

A recitation of the dimension of a memory arrangement in accordance with this invention is also helpful for an understanding of the utility thereof. Single wall domains three mils in diameter are taken as a starting point. Domains of this size are easily provided. Actually, the availability of materials having domains of one-half mil diameter or even in the micron range are anticipated. Each channel portion requires three sections each with fifty-one phase positions (PP) and one with fifty-three phases positions (fifty-one plus two to make the associated position in the return channel a phase-three position) as shown in FIG. 3 for channel portion W2. The read and write area and the connecting highway have the same number of positions. Each bit position is spaced apart three phases from the next adjacent position. For three mil domains, then, each position is spaced apart nine mils from the next and thus the entire memory is less than 700 mils wide. The entrance and return highways are, similarly, about 450 mils long. For half mil diameter domains, the size of the memory is reduced to less than 120 by about 85 mils.

The illustrative memory arrangement has been described in terms of a single wall domain implementation. It is to be recognized, however, that the two-dimensional character of such an implementation is particularly well adapted for practicing this invention. Other implementations are also well suited. Magnetic strip domains, for example, may be moved in thin sheets if the sheets are properly apertured or otherwise channeled to provide the requisite operation. Moreover, monolithic semiconductor shift registers may be operated in the manner described. All that is necessary is that channels of bistable positions be defined for realizing the described operation.

What has been described in considered only illustrative of the principles of this invention. Accordingly, it is to be understood that various other arrangements may be devised by one skilled in the art without departing from the spirit and scope thereof.

What is claimed is:

1. An information storage arrangement comprising a sheet of magnetic material in which single wall domains are moved in response to propagation fields, means for defining a plurality of propagation channels for single wall domains in said sheet, means for defining a common recirculating channel for domains from output to input positions in each of said propagation channels, means responsive to an input signal selecting a particular one of said propagation channels for completing a propagation loop for domains in said recirculating channel, means for introducing single wall domains into consecutive positions in said recirculating channel, and means for selectively annihilating domains in said recirculating channel.

2. An information storage arrangement comprising a sheet of magnetic material in which single wall domains are moved in response to propagation fields, means for defining a plurality of propagation channels for single wall domains in said sheet, means for defining in said sheet a recirculating channel for single wall domains, said channel including first and second portions, means responsive to a first signal for substituting a selected propagation channel for said second portion of said recirculating channel, means responsive to a second signal for introducing single wall domains into consecutive positions in said first portion of said recirculating channel, and coded input means for selectively annihilating single wall domains in said first portion of said recirculating channel.

3. A storage arrangement in accordance with claim 2 comprising sensing means including a plurality of conductors coupled to said first portion for sensing the presence and absence of single wall domains in said first portion.

4. A storage arrangement in accordance with claim 3 also including means coupled to corresponding positions in each of said propagation channels responsive to said first signal for annihilating corresponding coded ones of single wall domains for providing coded home zeros in each of said propagation channels.

5. A storage arrangement in accordance with claim 4 also including a single wall domain propagation counter channel, means for advancing a single wall domain in said counter channel synchronously with the movement of single wall domains in a selected propagation channel, and means responsive to the arrival of said coded home zeros at the couplings between said sensing means conductors and said first portion for reversing the direction of movement of said single wall domain in said counter channel when propagation pulses are next applied to advance single wall domains in said first portion.

6. A storage arrangement in accordance with claim 5 wherein said coded input means is responsive to consecutive coded input signals for annihilating coded ones of said single wall domains in associated positions in said first portion thus generating in said first portion a pattern comprising the presence and absence of domains representing binary ones and zeros respectively.

7. A storage arrangement in accordance with claim 6 also including means responsive to each coded input signal for advancing a prescribed number of positions the presence and absence of domains in said recirculating channel and in said counter channel.

8. A storage arrangement in accordance with claim 7 also including means responsive to a third signal for returning the presence and absence of domains in said first portion of said recirculating channel to a selected propagation channel and said single wall domain in said counter channel to its initial position synchronously.

9. A storage arrangement in accordance with claim 8 wherein a single wall domain pattern is moved from position to position in said recirculating channel and in each of said propagation channels by consecutively offset propagation fields generated in a three-phase manner, and means for generating said propagation fields, said last-mentioned means comprising a first conductor coupled in a first sense to associated positions along a corresponding propagation channel and in an opposite sense to a position in said circulating channel next adjacent said corresponding propagation channel, said last-mentioned means also comprising second and third conductors coupled to corresponding positions in each of said propagation channels, and means responsive to said first signal for pulsing said first, second, and third conductors consecutively.

10. An information storage arrangement comprising a plurality of propagation channels, a recirculating propagation channel having first and second portions, means for propagating information synchronously in said plurality and recirculating propagation channels, means responsive to a first signal for substituting a selected one of said plurality of propagation channels for said second portion of said recirculating channel, and signal responsive means for introducing information into said first portion of said recirculating channel.

References Cited

UNITED STATES PATENTS 3,248,716 4/1966 Snyder ------------ 340—174

STANLEY M. URYNOWICZ, Jr., Primary Examiner